United States Patent
Yakimchuk et al.

(10) Patent No.: US 12,410,785 B2
(45) Date of Patent: Sep. 9, 2025

(54) EQUALIZER BEARING ASSEMBLY HAVING WEDGED RETAINERS

(71) Applicant: TRC Services, Inc., The Woodlands, TX (US)

(72) Inventors: Darius J. Yakimchuk, St Albert (CA); Robert G. McDonald, Argyle, TX (US)

(73) Assignee: TRC Services, Inc., The Woodlands, TX (US)

( * ) Notice: Subject to any disclaimer, the term of this patent is extended or adjusted under 35 U.S.C. 154(b) by 300 days.

(21) Appl. No.: 18/100,293

(22) Filed: Jan. 23, 2023

(65) Prior Publication Data
US 2024/0247652 A1  Jul. 25, 2024

(51) Int. Cl.
| | |
|---|---|
| *F04B 47/02* | (2006.01) |
| *E21B 43/12* | (2006.01) |
| *F16D 125/20* | (2012.01) |
| *F16H 21/16* | (2006.01) |

(52) U.S. Cl.
CPC .......... *F04B 47/028* (2013.01); *E21B 43/127* (2013.01); *F16H 21/16* (2013.01); *F16D 2125/20* (2013.01)

(58) Field of Classification Search
CPC .... F04B 47/028; F16H 21/16; F16D 2125/20; E21B 43/127
USPC .......................................................... 74/41
See application file for complete search history.

(56) References Cited

U.S. PATENT DOCUMENTS

| | | | |
|---|---|---|---|
| 4,092,872 | A | 6/1978 | McClure |
| 4,121,471 | A | 10/1978 | Chancellor |
| 10,215,012 | B2 | 2/2019 | McDonald et al. |
| 11,098,708 | B2 | 8/2021 | Schmitt et al. |
| 11,174,856 | B2 | 11/2021 | Robison et al. |
| 2016/0201664 | A1 | 7/2016 | Robison et al. |
| 2019/0330964 | A1 | 10/2019 | Yakimchuk et al. |
| 2020/0309112 | A1 | 10/2020 | Yakimchuk et al. |

FOREIGN PATENT DOCUMENTS

CN  111720099 A  * 9/2020

OTHER PUBLICATIONS

American International Manufacturing Corp, AIMCO Catalogue, undated, 20-pgs.
Lufkin, "Conventional & Reverse Mark Pumping Units," Installation Manual CU-09, undated, available from thehistorycenteronline.com page Lufkin Oil Field Equipment Catalogs, Bulletins, Brochures, ca. 1926-2002, 61-pgs.

(Continued)

*Primary Examiner* — T. Scott Fix
(74) *Attorney, Agent, or Firm* — Cabello Hall Zinda, PLLC

(57) ABSTRACT

An assembly is used to connect an equalizer bar to a walking beam of a reciprocating pump unit. The walking beam has a bearing shaft having cylindrical ends. Brackets attached to the equalizer bar define slots, each having a hooked section and having a base section. The hooked sections are configured to rest against the cylindrical ends of the bearing shaft. The base sections of the slots oppose the hooked sections at a gap from the cylindrical ends of the bearing shaft. Wedges are configured to position in the slots between the bases and the cylindrical ends of the bearing shaft.

22 Claims, 5 Drawing Sheets

(56) References Cited

OTHER PUBLICATIONS

Weatheford International, "Maximiser III," copyright 2018, pp. 28-34.
Weatherford International, "Ampscot(R) Operator's Manual," Manual, copyright 2015, 47-pgs.
Weatherford International, "Ampscot(TM) Pumping Units," Product Catalog Revision 1.0, copyright 2009, 34 pgs.

* cited by examiner

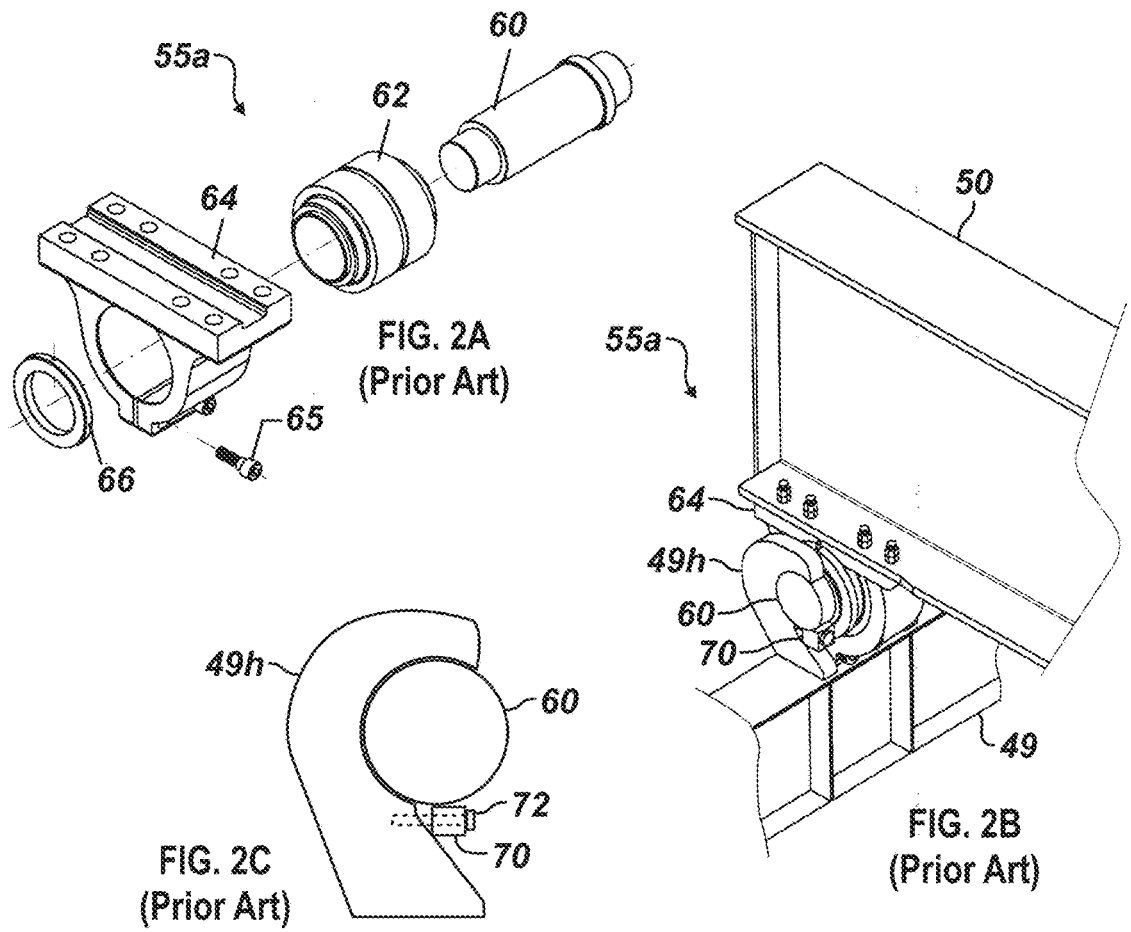
FIG. 2A (Prior Art)
FIG. 2C (Prior Art)
FIG. 2B (Prior Art)
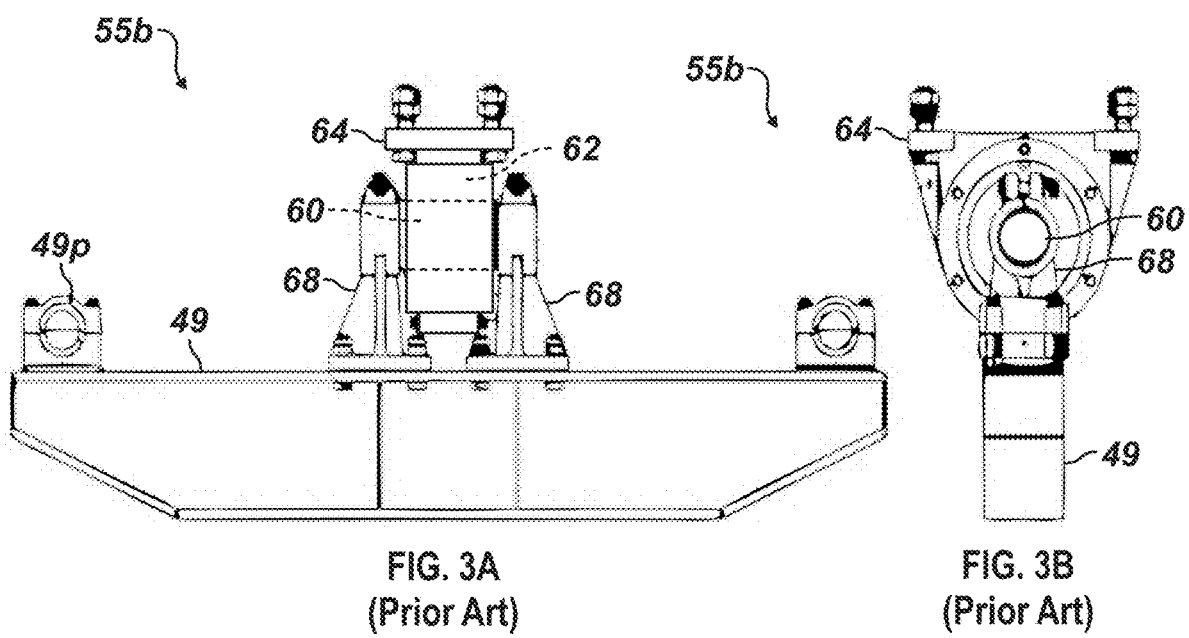
FIG. 3A (Prior Art)
FIG. 3B (Prior Art)

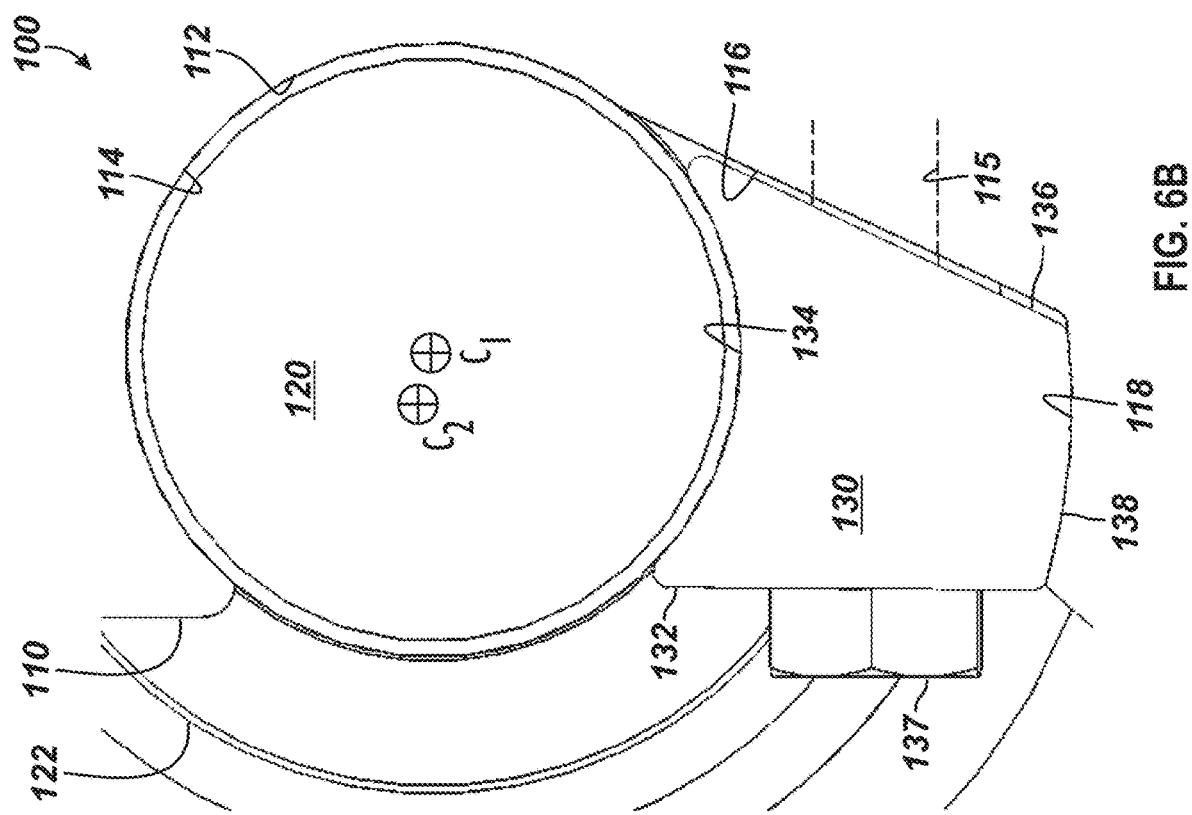
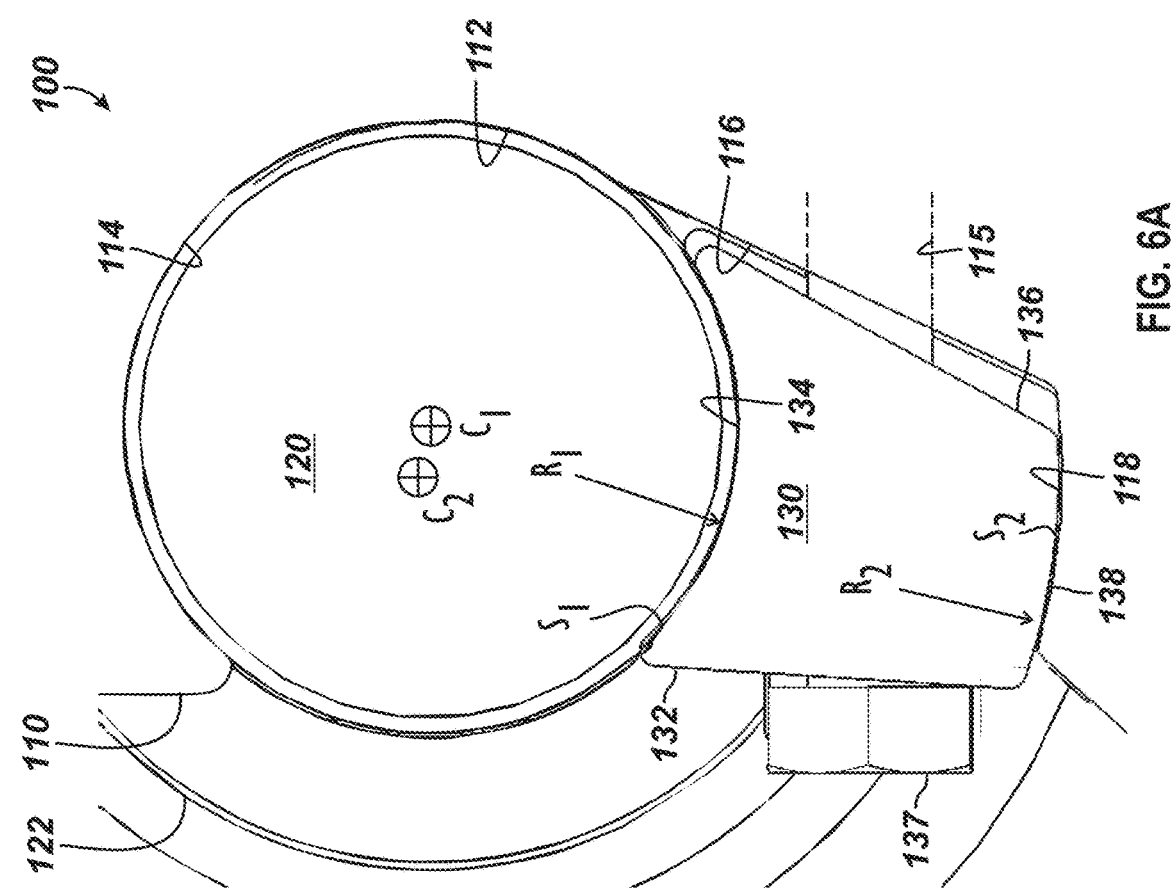

EQUALIZER BEARING ASSEMBLY HAVING WEDGED RETAINERS

BACKGROUND OF THE DISCLOSURE

Reciprocating pump systems, such as sucker rod pump systems, extract fluids from a well and employ a downhole pump connected to a driving source at the surface. A rod string connects the surface driving force to the downhole pump in the well. When operated, the driving source cyclically raises and lowers the downhole pump, and with each stroke, the downhole pump lifts well fluids toward the surface.

For example, FIG. 1 shows a sucker rod pump system 10 used to produce fluid from a well. A downhole pump 14 has a barrel 16 with a standing valve 24 located at the bottom. The standing valve 24 allows fluid to enter from the wellbore, but the standing valve 24 does not allow the fluid to leave. Inside the pump barrel 16, a plunger 20 has a traveling valve 22 located at the top. The traveling valve 22 allows fluid to move from below the plunger 20 to the production tubing 18 above, but the traveling valve 22 does not allow fluid to return from the tubing 18 to the pump barrel 16 below the plunger 20. A driving source (e.g., a pump jack or pumping unit 30) at the surface connects by a rod string 12 to the plunger 20 and moves the plunger 20 up and down cyclically in upstrokes and downstrokes.

During the upstroke, the traveling valve 22 is closed, and any fluid above the plunger 20 in the production tubing 18 is lifted towards the surface. Meanwhile, the standing valve 24 opens and allows fluid to enter the pump barrel 16 from the wellbore.

At the top of stroke, the standing valve 24 closes and holds in the fluid that has entered the pump barrel 16. Furthermore, throughout the upstroke, the weight of the fluid in the production tubing 18 is supported by the traveling valve 22 in the plunger 20 and, therefore, also by the rod string 12, which causes the rod string 12 to stretch. During the downstroke, the traveling valve opens, which results in a rapid decrease in the load on the rod string 12. The movement of the plunger 20 from a transfer point to the bottom of stroke is known as the "fluid stroke" and is a measure of the amount of fluid lifted by the pump 14 on each stroke.

At the surface, the pump unit 30 is driven by a prime mover 40, such as an electric motor or internal combustion engine, mounted on a pedestal above a base 32. Typically, a pump controller 36 monitors, controls, and records the pump unit's operation. Structurally, a Samson post 34 on the base 32 provides a fulcrum on which a walking beam 50 is pivotally supported by a saddle bearing assembly 35.

Output from the motor 40 is transmitted to a gearbox 42, which provides low-speed, high-torque rotation of a crankshaft 43. Both ends of the crankshaft 43 rotate crank arms 44 having counterbalance weights 46. Each crank arm 44 is pivotally connected to a pitman arm 48 by a crank pin bearing 45. In turn, the two pitman arms 48 are connected to an equalizer bar 49, which is pivotally connected to the rear end of the walking beam 50 by an equalizer bearing assembly 55.

A horsehead 52 with an arcuate forward face 54 is mounted to the forward end of the walking beam 50. As is typical, the face 54 may have tracks or grooves for carrying a flexible wire rope bridle 56. At its lower end, the bridle 56 terminates with a carrier bar 58, upon which a polished rod 15 is suspended. The polished rod 15 extends through a packing gland or stuffing box at the wellhead 13. The rod string 12 of sucker rods hangs from the polished rod 15 within the tubing string 18 located within the well casing and extends to the downhole pump 14.

A hook-type attachment has been used for decades on the equalizer bearing assembly 55 to connect the equalizer beam 49 to a bearing shaft on the beam 50. FIGS. 2A-2C show features of a hook-type attachment 55a according to the prior art. As shown in FIG. 2A, the attachment 55a includes an equalizer shaft 60, a bearing 62, a bearing housing 64, and a retaining ring 66. As shown in FIG. 2B, the equalizer shaft 60 fits in the bearing 62, and bearing housing 64 supports the bearing 62 by clamping thereabout with fasteners 65. The bearing housing 64 is affixed to the walking beam 50. The equalizer bar 49 has hooks 49h that fit onto the free ends of the equalizer shaft 60 so the equalizer bar 49 can be supported on the walking beam 50 and can articulate relative thereto. As shown in the detail of FIG. 2C, retaining blocks 70 can be affixed by bolts 72 to the hooks 49h so the retaining blocks 70 rest under free ends of the equalizer shaft 60.

As will be appreciated, this hook-type attachment 55a in FIGS. 2A-2C is designed to only withstand tensile loading. The retaining blocks 70 and bolts 72 only retain the hook 49h to the equalizer shaft 60 under ideal operating conditions. If there is compressive loading (e.g., in the case of a polished rod hang-up, high rod part, or other type of abrupt shock loading), the bolts 72 for the retaining blocks 70 experience large amounts of bending stresses, which can often result in failure of this connection and produce catastrophic collapse of the structure.

Other than a hook-type attachment as discussed above, bolted clamps have also been used in the past to retain an equalizer beam to an equalizer bearing shaft. FIGS. 3A-3B show a bolted clamp attachment 55b used to attach an equalizer bar 49 to an equalizer shaft 60. The attachment 55b includes an equalizer shaft 60, a bearing 62, and a bearing housing 64. The bearing housing 64 bolts to the underside of the walking beam (not shown). Clamps 68 are affixed to the equalizer bar 49 and clamp around the free ends of the equalizer shaft 60. Bolts hold the ends of the clamps 68 together.

Assembling this bolted clamp attachment 55b is time consuming. If the bolts are not torqued properly upon initial installation and are not inspected and re-tightened periodically, the bolts are prone to fatigue and can fail prematurely causing the catastrophic collapse of the pumping unit.

The subject matter of the present disclosure is directed to overcoming, or at least reducing the effects of, one or more of the problems set forth above.

SUMMARY OF THE DISCLOSURE

An assembly disclosed herein is used to connect arms of a reciprocating pump unit to a walking beam of the reciprocating pump unit. The walking beam has a bearing shaft with cylindrical ends. The assembly comprises an equalizer bar and wedges. The equalizer bar has brackets, and each of the brackets defines a slot. The slot has a hooked section and has a base section. The hooked section is configured to rest against a respective one of the cylindrical ends of the bearing shaft, and the base section opposes a respective one of the hooked sections at a gap from the cylindrical end of the bearing shaft. The wedges are configured to position in the slots between the base sections and the cylindrical ends of the bearing shaft. Each of the wedges has first and second edges. The first edge is configured to rest against the cylindrical end of the bearing shaft, and the second edge opposes the first edge and is configured to rest against the base section of the slot.

The assembly can comprise fasteners or bolts, each affixing a respective one of the wedges in a respective one of the slots. Each of the wedges can define an opening therethrough, and each of the slots can define a bolt hole. Each of the bolts can be configured to position in the opening defined through the wedge and to thread into the bolt hole in the slot.

The first edge can have a concave profile, and the second edge can have a convex profile. The concave profile can define a first segment that is larger than a second segment of the convex profile. The concave profile can define a first radius of curvature matching the cylindrical end of the bearing shaft. The convex profile can define a second radius of curvature at a central axis offset from a rotational axis of the bearing shaft. The base section can define a corresponding concave profile being complementary to the convex profile of the second edge. The convex profile can define a radius of curvature at a central axis offset from a rotational axis of the bearing shaft.

The assembly can comprise a bearing housing configured to attach to the walking beam. The bearing housing has a bearing configured to support the bearing shaft for rotation therein.

An assembly disclosed herein is configured to connect an equalizer bar to a walking beam of a reciprocating pump unit. The walking beam has a bearing shaft with cylindrical ends. The assembly comprises brackets and wedges. The brackets are configured to attach to the equalizer bar. Each of the brackets defines a slot, which has a hooked section and a base section. The hooked section is configured to rest against a respective one of the cylindrical ends of the bearing shaft, and the base section opposes a respective one of the hooked sections at a gap from the cylindrical end of the bearing shaft. The wedges are configured to position in the slots between the bases and the cylindrical ends of the bearing shaft. Each of the wedges has first and second edges. The first edge is configured to rest against the cylindrical end of the bearing shaft, and the second edge opposes the first edge and is configured to rest against the base section of the slot.

A reciprocating pump unit disclosed herein comprises arms, an equalizer bar, a walking beam, and an assembly. The arms are configured to translate on the reciprocating pump unit, and the equalizer bar is hingedly connected to the arms. The walking beam is mounted to pivot on the reciprocating pump unit, and the assembly connects the equalizer bar to the walking beam.

The assembly comprises a shaft, a bearing, brackets, and wedges. The shaft has cylindrical ends, and the bearing is disposed on the walking beam and supports the shaft to rotate. The brackets are disposed on the equalizer bar, and each of the brackets defining a slot, which has a hooked section and a base section. The hooked section is configured to rest against a respective one of the cylindrical ends of the shaft, and the base section opposes a respective one of the hooked sections at a gap from the cylindrical end of the pin. The wedges are disposed in the slots between the cylindrical ends of the shaft and the base sections of the slots. Each of the wedges has first and second edges. The first edge rests against the cylindrical end of the shaft, and the second edge opposes the first edge and rests against the base section of the slot.

A method disclosed herein is used to connect an equalizer bar to a walking beam of a reciprocating pump unit. The method comprises: attaching a bearing to the walking beam, the bearing having a shaft with cylindrical ends; resting hooked sections of slots defined in brackets on the equalizer bar to rest against the cylindrical ends of the shaft; and positioning wedges in the slots in a gap between base sections of the slots and the cylindrical ends of the shaft.

The foregoing summary is not intended to summarize each potential embodiment or every aspect of the present disclosure.

BRIEF DESCRIPTION OF THE DRAWINGS

FIG. 2A illustrates an exploded view of an equalizer bearing assembly of the prior art.

FIG. 2B illustrates a perspective view of a prior art hook-type attachment for connecting an equalizer beam to a walking beam.

FIG. 2C illustrates a detailed view of the hook-type attachment in FIG. 2B.

FIG. 3A illustrates a front view of an equalizer bearing assembly having a bolted clamp attachment of the prior art for connecting an equalizer bar to a walking beam.

FIG. 3B illustrates a side view of the bolted clamp attachment in FIG. 3A.

FIGS. 6A-6B illustrate side views of the cam wedge seated during bolt tightening of the disclosed equalizer bearing assembly.

DETAILED DESCRIPTION OF THE DISCLOSURE

Figure 1:
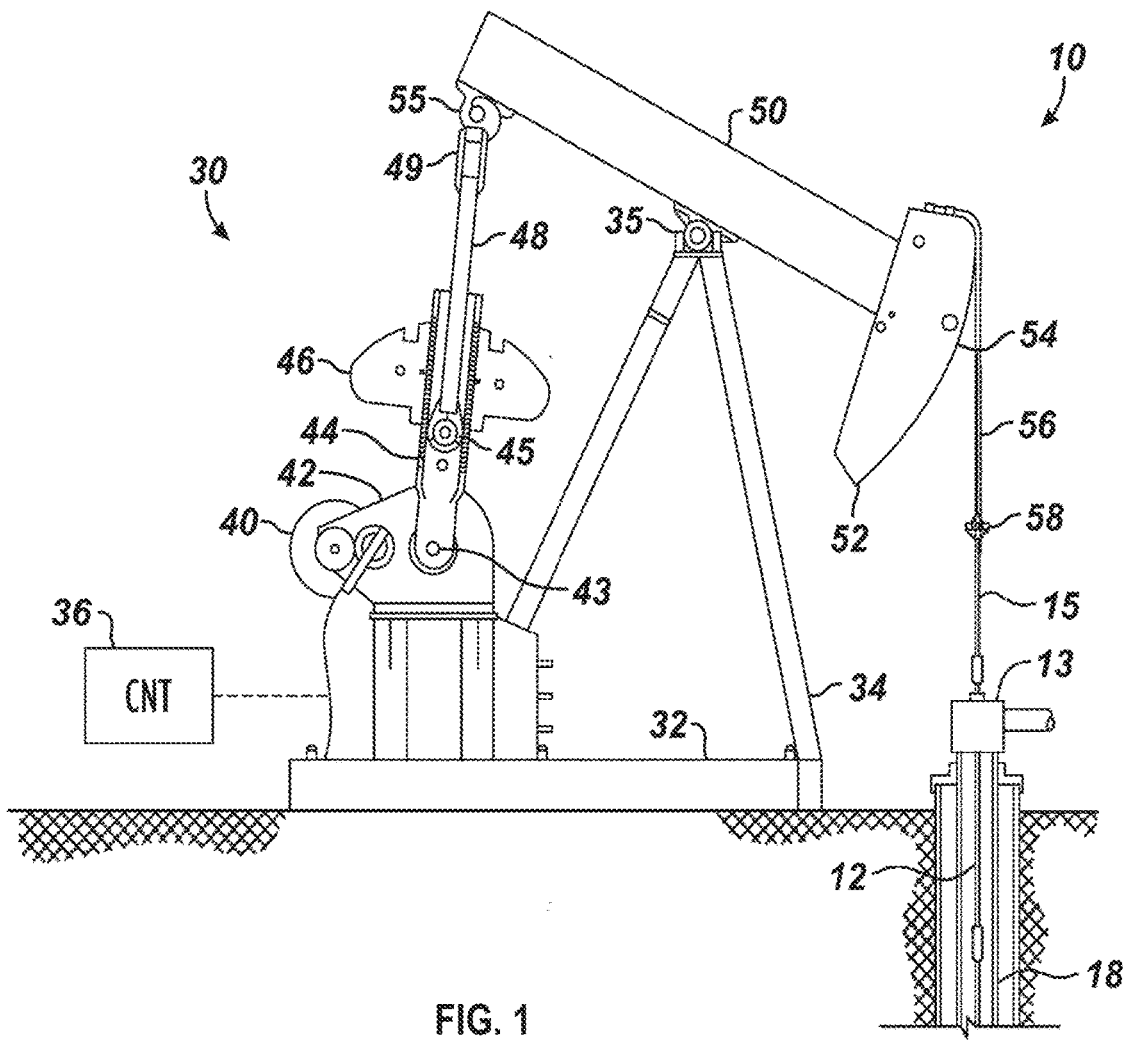
FIG. 1 illustrates an example of a reciprocating rod pump system known in the art.
Figure 4:
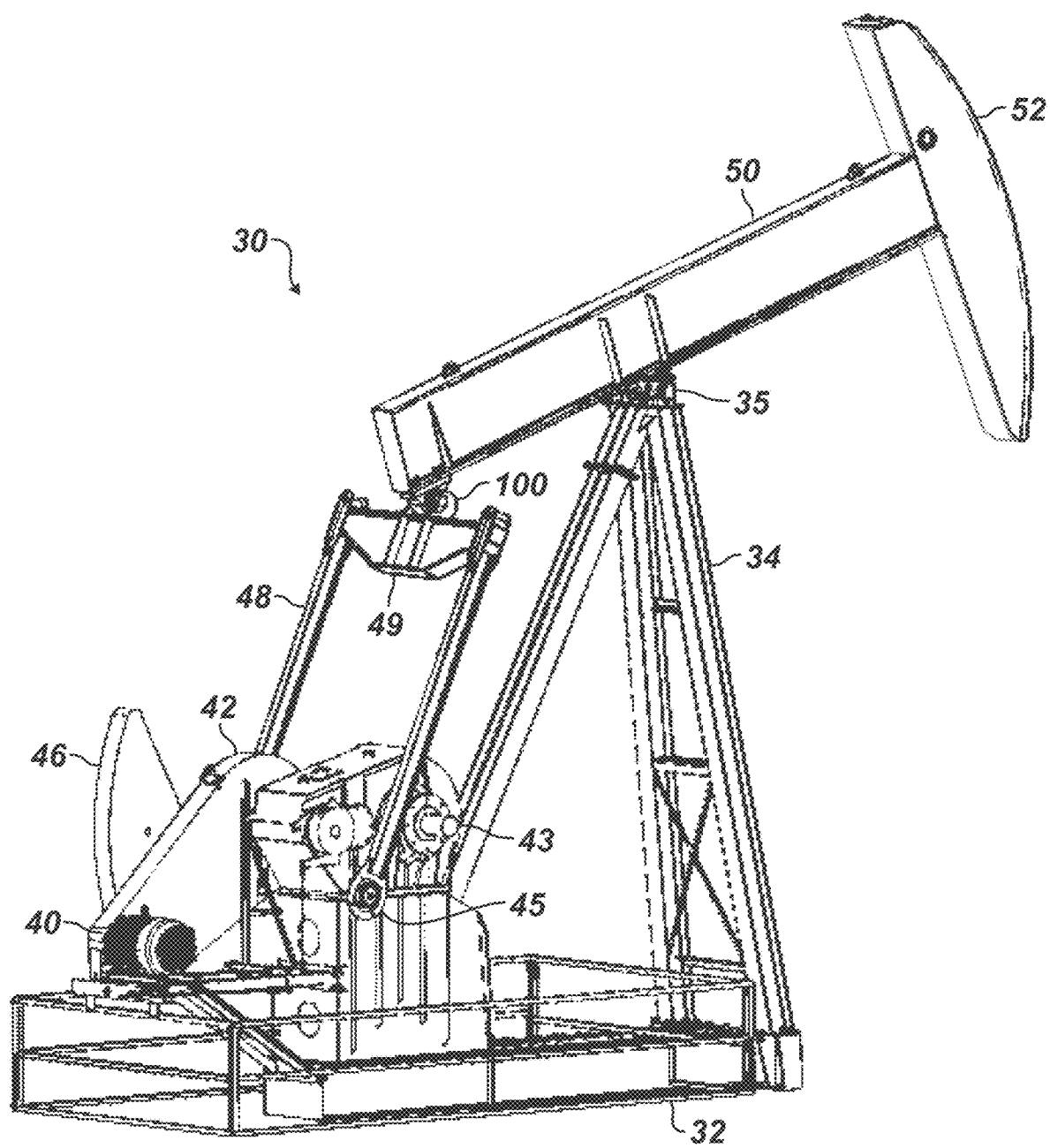
FIG. 4 illustrates an example of a reciprocating pump unit having an equalizer bearing assembly of the present disclosure.

FIG. 4 illustrates a reciprocating pump unit or pump jack 30 of the present disclosure used to produce fluid from a well. The pump unit 30 is similar to that disclosed above with reference to FIG. 1 so that like reference numerals are used. As before, the pump unit 30 includes pitman arms 48, an equalizer bar 49, and a walking beam 50. A horsehead 52 is mounted to the forward end of the walking beam 50.

In general, the pitman arms 48 are configured to translate on the pump unit 30, and the equalizer bar 49 is hingedly connected to the arms 48. The walking beam 50 is mounted to pivot on the pump unit 30, and an equalizer bearing assembly 100 of the present disclosure connects the equalizer bar 49 to the walking beam 50.

During operation, for example, the pump unit 30 is driven by a prime mover 40 mounted on a pedestal above a base 32. Structurally, a Samson post 34 on the base 32 provides a fulcrum on which the walking beam 50 is pivotally supported by a saddle bearing assembly 35.

Output from the motor 40 is transmitted to a gearbox 42, which provides low-speed, high-torque rotation of a crankshaft 43. Both ends of the crankshaft 43 rotate crank arms (one crank arm is not shown in FIG. 4 and the other crank arm is not visible), which have counterbalance weights 46. Each crank arm is pivotally connected to a pitman arm 48 by a crank pin bearing 45. In turn, the two pitman arms 48 are connected to the equalizer bar 49, which is pivotally connected to the rear end of the walking beam 50 by the equalizer bearing assembly 100 of the present disclosure.

Figure 5A:
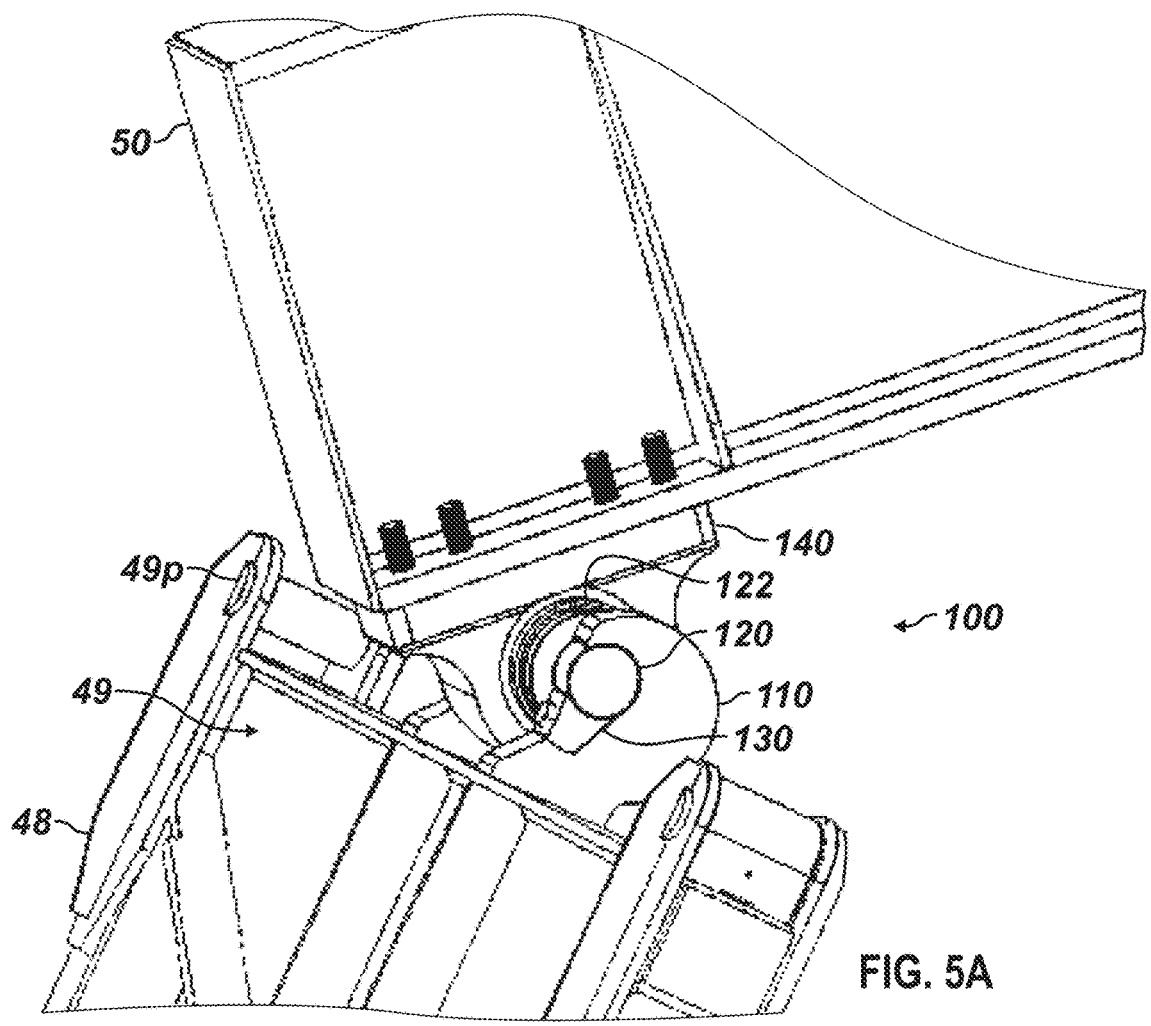
FIG. 5A illustrates a detailed perspective view of an equalizer bearing assembly of the present disclosure connecting an equalizer bar to a walking beam.

FIG. 5A illustrates a detailed perspective view of an equalizer bearing assembly 100 of the present disclosure connecting an equalizer bar 49 to a walking beam 50. The equalizer bearing assembly 100 includes brackets or hooks 110, an equalizer shaft or pin 120, a bearing 122, a bearing housing 140, and cam wedges 130. The equalizer shaft 120 has cylindrical ends that extend beyond the bearing 122. The bearing housing 140 is disposed on the walking beam 50 and supports the bearing 122 for the equalizer shaft 120 to rotate. The hooks or brackets 110 are disposed on the equalizer beam 49.

In this detailed view, the equalizer bar 49 is shown having the pitman arms 48 connected by hangers 49p on the equalizer bar 49. The hooks 110 extend from the equalizer bar 49. These hooks 110 can preferably be welded to the equalizer bar 49 as shown, although other forms of attachment (e.g., bolted flanges) can be used. The bearing housing 140 can be affixed to the walking beam 50 using bolts or the like. When the assembly 100 is assembled, the hooks 110 fit on free ends of the equalizer shaft 120, and the cam wedges 130 affix in the hooks 110 under the equalizer shaft 120.

Figure 5B:
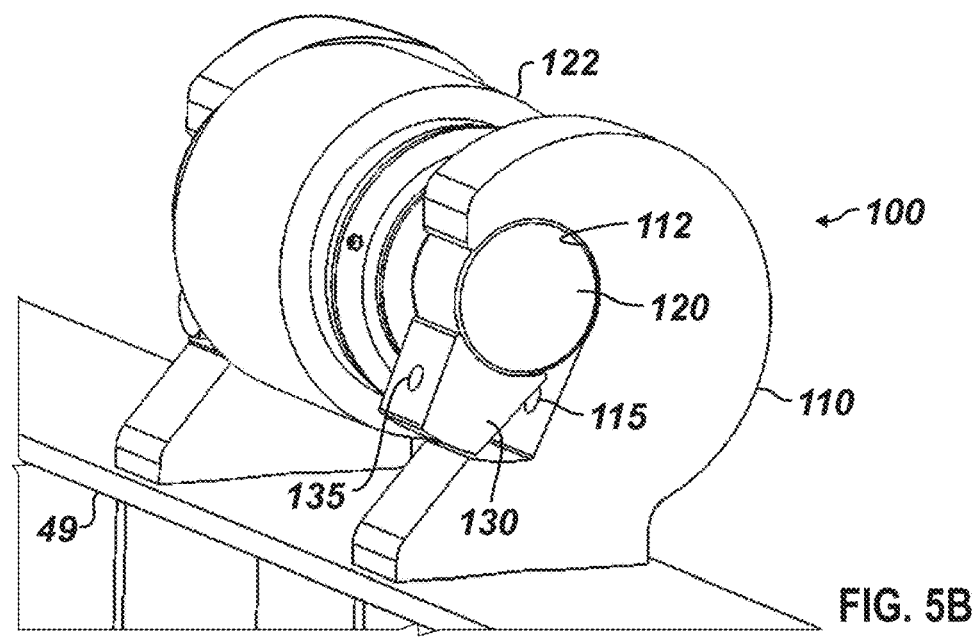
FIG. 5B illustrates another detailed perspective view, showing isolated components of the disclosed equalizer bearing assembly.

FIG. 5B illustrates another detailed perspective view, showing isolated components of the disclosed equalizer bearing assembly 100. The hooks 110 are shown on the equalizer beam 49, and the equalizer shaft 120 and bearing 122 are shown in isolation without the bearing housing. Each of the hooks 110 define a slot 112 having a hooked section and a base section. The hooked section of the slot 112 is configured to rest against a respective one of the cylindrical ends of the equalizer shaft 120. The base section opposes the hooked sections at a gap from the cylindrical end of the shaft 120.

In FIG. 5B, one of the cam wedges 130 is shown being pivoted in place in the slot 112 so the cam wedge 130 can fit between the equalizer shaft 120 and the hook 110. When disposed in the slot 112, the cam wedge 130 fits in the gap between the slot's base section and the shaft's cylindrical end. The cam wedge 130 has a through-passage 135 for a bolt (not shown), which threads into a bolt hole 115 exposed in the hook's slot 112.

FIGS. 6A-6B illustrate side views of a cam wedge 130 being seated during bolt tightening when the equalizer bearing assembly 100 of the present disclosure is being assembled. Again, the equalizer bearing assembly 100 has an equalizer shaft 120 that is supported on the walking beam (not shown). The equalizer shaft 120 is configured to rotate by a bearing 122. The hook or bracket 110 is disposed on the equalizer beam 49.

As noted above, the hook 110 defines a slot 112. In detail, the slot 112 has a hooked section 114, a face section 116, and a base section 118. The hooked section 114 is circumferential and is configured to rest against the cylindrical end of the equalizer shaft 120. The base section 118 opposes the hooked section 114 at a gap from the cylindrical end of the equalizer shaft 120. When installed, the cam wedge 130 is disposed in the slot 112 between the base section 118 and the cylindrical end of the equalizer shaft 120.

Once installed, the cam wedge 130 affixes in the slot 112 using a fastener 137. For example, the fastener 137 can be a bolt disposed in an opening (135) through the cam wedge 130 and threaded into a bolt hole 115 in the slot 112.

To connect the equalizer bar 49 to the walking beam 50 during assembly of the reciprocating pump unit (30), the bearing assembly 140 as shown in FIGS. 5A-5B is attached to the walking beam 50. For example, flanges on the bearing assembly 140 can bolt to the walking beam 50. As noted, the bearing assembly 140 has an internal bearing 122 that supports the cylindrical equalizer shaft 120 to rotate. Meanwhile, the hooks 110 are attached to the equalizer bar 49. For example, the hooks 110 can be pre-welded on the equalizer bar 49, but other forms of attachment, such as bolting, can be used.

As shown in FIGS. 6A-6B, the hooked section 114 of the hook 110 is hooked to rest against the cylindrical end of the equalizer shaft 120. The cam wedge 130 is then positioned in the slot 112 in the gap between the base section 118 and the cylindrical end of the shaft 120. The bolt 137 is passed through the through-hole (135) of the cam wedge 130 and is tightened in the bolt hole 115 of the hook 110 to affix the cam wedge 130 in the slot 112. Cam wedges 130 are installed on both of the hooks 110.

Other conventional steps can then be performed at the appropriate points in the assembly of the pump unit (30). For example, the pitman arms (48) can be attached to the equalizer bar 49; the wristpin bearing assemblies on the pitman arms (48) can be attached to the crank arms; etc.

The cam wedges 130 can overcome issues noted previously should the pump unit (30) experience compressive loading (e.g., in the case of a polished rod hang-up, high rod part, or other type of abrupt shock loading). The cam wedges 130 positively lock the hooked portion 114 of the slot 112 to the equalizer shaft 120 by camming matching profiles against the cylindrical end of the shaft 120 and the base section 118 of the slot 112.

Looking at the cam wedge 130 in detail in FIGS. 5A-5B, the cam wedge 130 defines a first edge 134 against which the cylindrical end of the shaft 120 is configured to rest. Additionally, the cam wedge 130 defines a second edge 138, which is opposite the first edge 134 and is configured to rest against the base section 118 of the slot 112. The first edge 134 is a concave edge, defining a cylindrical profile matching the cylindrical end of the equalizer shaft 120 that rests against it. The radius $R_1$ of curvature for this concave edge 134 is centered at the central, rotational axis $C_1$ of the equalizer shaft 120. Meanwhile, the second edge 138 is a convex edge, defining a cylindrical profile with a larger radius $R_2$ of curvature that is centered at an offset central axis $C_2$ from that of the equalizer shaft 120. The concave edge 134 defines a first segment $S_1$ that is larger than a second segment $S_2$ of the convex edge 138. This allows the cam wedge 130 to support more surface area of the cylindrical end of the shaft 120.

During assembly, the cam wedge 130 is inserted in the slot 112 between the shaft's cylindrical end and the slot's base section 118. The bolt 137 passes through the cam wedge 130 at the opening in a front face 132 and is threaded into the bolt hole 112 in the face section 116 of the slot 112. As the bolt 137 is tightened, the matching concave edge 134 fits up against the cylindrical shaft 110. The cam wedge 130 rotates into place using the offset center $C_2$ so the convex edge 138 is pulled into the correspondingly shaped base section 118 of the hooked slot 112 to create a full contact load path.

The separation between the back face 136 and face section 116 closes as the cam wedge bolt 137 is tightened, and the cam wedge 130 is pivoted toward the slot's face section 116. Tightening the bolt 137 thereby locks the cam wedge 130 in place. A solid line of contact between the shaft 120 and the slot's base section 118 creates a path to support compressive loading should it occur.

Ideally, the arrangement does not produce stress concentrations or bending in the bolt 137. Instead, the cam wedge 130 allows compressive load from the equalizer shaft 120 on the walking beam (50) to pass to the equalizer bar 49. The equalizer bearing assembly 100 can be designed to take the loading so there may be no need for inspection after high compressive loading occurs during operation of the pump unit (30). In the end, the equalizer bearing assembly 100 uses the proven hook-style connection, which can be quickly assembled in the field between an equalizer bar (49) and walking beam (50). Meanwhile, the cam wedge 130 enables the assembly 100 to take compressive loading.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An assembly to connect arms of a reciprocating pump unit to a walking beam of the reciprocating pump unit, the walking beam having a bearing shaft with cylindrical ends, the assembly comprising:
   an equalizer bar having brackets, each of the brackets defining a slot, the slot having a hooked section and having a base section, the hooked section being configured to rest against a respective one of the cylindrical ends of the bearing shaft, the base section opposing a respective one of the hooked sections at a gap from the cylindrical end of the bearing shaft, the base section defining a base concave profile; and
   wedges being configured to pivot into position in the slots between the base sections of the slots and the cylindrical ends of the bearing shaft, each of the wedges having first and second edges, the first edge having an edge concave profile, the edge concave profile being configured to rotate against the cylindrical end of the bearing shaft, the second edge opposing the first edge and having an edge convex profile, the edge convex profile being complementary to the base concave profile of the base section and being configured to cam against the base concave profile of the base section of the slot.

2. The assembly of claim 1, wherein the assembly comprises fasteners, each affixing a respective one of the wedges in a respective one of the slots.

3. The assembly of claim 2, wherein each of the wedges defines an opening therethrough; wherein each of the slots defines a bolt hole; and wherein each of the fasteners is a bolt disposed in the opening defined through the wedge and threaded into the bolt hole in the slot.

4. The assembly of claim 1, wherein the edge concave profile defines a first segment that is larger than a second segment of the edge convex profile.

5. The assembly of claim 1, wherein the edge concave profile defines a first radius of curvature matching the cylindrical end of the bearing shaft.

6. The assembly of claim 5, wherein the edge convex profile defines a second radius of curvature at a central axis offset from a rotational axis of the bearing shaft.

7. The assembly of claim 6, wherein the base concave profile defines the second radius of curvature at the central axis offset from the rotational axis of the bearing shaft.

8. The assembly of claim 1, wherein the assembly comprises a bearing housing configured to attach to the walking beam, the bearing housing having a bearing configured to support the bearing shaft for rotation therein.

9. The assembly of claim 1, wherein the brackets are welded to the equalizer bar.

10. An assembly to connect an equalizer bar to a walking beam of a reciprocating pump unit, the walking beam having a bearing shaft with cylindrical ends, the assembly comprising:
    brackets configured to attach to the equalizer bar, each of the brackets defining a slot, the slot having a hooked section and having a base section, the hooked section being configured to rest against a respective one of the cylindrical ends of the bearing shaft, the base section opposing a respective one of the hooked sections at a gap from the cylindrical end of the bearing shaft, the base section defining a base concave profile; and
    wedges configured to pivot into position in the slots between the base sections of the slots and the cylindrical ends of the bearing shaft, each of the wedges having first and second edges, the first edge having an edge concave profile, the edge concave profile being configured to rotate against the cylindrical end of the bearing shaft, the second edge opposing the first edge and having an edge convex profile, the edge convex profile being complementary to the base concave profile of the base section and being configured to cam against the base concave profile of the base section of the slot.

11. The assembly of claim 10, wherein the assembly comprises bolts, each affixing a respective one of the wedges in a respective one of the slots, wherein each of the wedges defines an opening therethrough; wherein each of the slots defines a bolt hole; and wherein each of the bolts is configured to position in the opening defined through the wedge and to thread into the bolt hole in the slot.

12. The assembly of claim 10, wherein at least one of:
    the edge concave profile defines a first segment that is larger than a second segment of the edge convex profile;
    the edge concave profile defines a first radius of curvature matching the cylindrical end of the bearing shaft;
    the edge convex profile defines a second radius of curvature at a central axis offset from a rotational axis of the bearing shaft; and
    the base concave profile defines the second radius of curvature at the central axis offset from the rotational axis of the bearing shaft.

13. The assembly of claim 10, comprising a bearing housing configured to attach to the walking beam, the bearing housing having a bearing configured to support the bearing shaft for rotation therein.

14. A reciprocating pump unit, comprising:
    arms configured to translate on the reciprocating pump unit;
    an equalizer bar hingedly connected to the arms;
    a walking beam mounted to pivot on the reciprocating pump unit; and
    an assembly connecting the equalizer bar to the walking beam, the assembly comprising:
    a shaft having cylindrical ends;
    a bearing disposed on the walking beam and supporting the shaft to rotate;

brackets disposed on the equalizer bar, each of the brackets defining a slot, the slot having a hooked section and having a base section, the hooked section configured to rest against a respective one of the cylindrical ends of the shaft, the base section opposing a respective one of the hooked sections at a gap from the cylindrical end of the shaft, the base section defining a base concave profile; and wedges pivoted into position in the slots between the cylindrical ends of the shaft and the base sections of the slots, each of the wedges having first and second edges, the first edge having an edge concave profile, the edge concave profile rotated against the cylindrical end of the shaft, the second edge opposing the first edge and having an edge convex profile, the edge convex profile being complementary to the base concave profile of the base section and cammed against the base concave profile of the base section of the slot.

15. The reciprocating pump unit of claim 14, wherein the assembly comprises bolts, each affixing a respective one of the wedges in a respective one of the slots, wherein each of the wedges defines an opening therethrough; wherein each of the slots defines a bolt hole; and wherein each of the bolts is configured to position in the opening defined through the wedge and to thread into the bolt hole in the slot.

16. The reciprocating pump unit of claim 14, wherein at least one of:
the edge concave profile defines a first segment that is larger than a second segment of the edge convex profile;
the edge concave profile defines a first radius of curvature matching the cylindrical end of the shaft;
the edge convex profile defines a second radius of curvature at a central axis offset from a rotational axis of the shaft; and
the base concave profile defines the second radius of curvature at the central axis offset from the rotational axis of the shaft.

17. The reciprocating pump unit of claim 14, wherein the assembly comprises a bearing housing configured to attach to the walking beam, the bearing housing having the bearing configured to support the shaft for rotation therein.

18. A method to connect an equalizer bar to a walking beam of a reciprocating pump unit, the method comprising:

attaching a bearing to the walking beam, the bearing having a shaft with cylindrical ends;

resting hooked sections of slots defined in brackets on the equalizer bar to rest against the cylindrical ends of the shaft; and pivoting wedges into position in the slots in a gap between base sections of the slots and the cylindrical ends of the shaft by:
rotating edge concave profiles of first edges of the wedges on the cylindrical ends of the shaft, and
camming edge convex profiles of second edges of the wedges on base concave profiles of the base sections complementary to the edge convex profiles.

19. The method of claim 18, wherein pivoting the wedges into position in the slots comprises bringing inside edges of the wedges toward sides of the slots by tightening the wedges in place with bolts, each bolt extending through an opening from an outside edge of the wedge to the inside edge of the wedge and affixing to a bolt hole defined in the side of the slot.

20. The method of claim 18, wherein rotating the edge concave profiles of the first edges on the cylindrical ends of the shaft comprises moving the edge concave profiles along a radius of curvature matching the cylindrical ends of the shaft; and wherein camming the edge convex profiles on the base concave profiles comprises moving the edge convex profiles on a second radius of curvature at a central axis offset from a rotational axis of the shaft, the central axis offset away from the hooked sections of the slots.

21. The assembly of claim 1, wherein the wedges pivoted into position in the slots have a solid line of contact between the cylindrical ends and the edge concave profiles and between the edge convex profiles and the base concave profiles, the solid line of contact being configured to support compressive loading between the cylindrical ends and the base sections.

22. The reciprocating pump unit of claim 14, wherein the wedges pivoted into position in the slots have a solid line of contact between the cylindrical ends and the edge concave profiles and between the edge convex profiles and the base concave profiles, the solid line of contact being configured to support compressive loading between the cylindrical ends and the base sections.

* * * * *